United States Patent [19]
Tegeler

[11] Patent Number: 5,749,302
[45] Date of Patent: May 12, 1998

[54] RAIL-BORNE MOTOR COACH

[75] Inventor: Ferdinand Tegeler, Berlin, Germany

[73] Assignee: ABB Henschel AG, Berlin, Germany

[21] Appl. No.: 656,415

[22] Filed: May 30, 1996

Related U.S. Application Data

[63] Continuation of PCT/EP95/03777, Sep. 23, 1995.

[30] Foreign Application Priority Data

Sep. 30, 1994 [DE] Germany ............................ 9415771 U

[51] Int. Cl.⁶ ................................................. B61D 17/00
[52] U.S. Cl. ............................ 105/397; 105/399; 105/401; 105/423
[58] Field of Search ................................. 105/396, 397, 105/398, 399, 401, 422, 423, 3, 329.1, 400

[56] References Cited

U.S. PATENT DOCUMENTS

| | | | |
|---|---|---|---|
| 401,529 | 4/1889 | Zurcher | 105/399 |
| 830,922 | 9/1906 | Ostrander | 105/399 |
| 2,040,257 | 5/1936 | Heyner | 105/399 |
| 2,171,425 | 8/1939 | Dean et al. | 105/399 |
| 4,337,708 | 7/1982 | Peterson | 105/401 |
| 5,140,913 | 8/1992 | Takeichi et al. | 105/397 |

FOREIGN PATENT DOCUMENTS

| | | | |
|---|---|---|---|
| 618124 | 10/1994 | European Pat. Off. | 105/397 |
| 707679 | 7/1931 | France | 105/397 |
| 568446 | 10/1957 | Italy | 105/422 |
| 418428 | 10/1934 | United Kingdom | 105/399 |

*Primary Examiner*—Mark T. Le
*Attorney, Agent, or Firm*—Herbert L. Lerner; Laurence A. Greenberg

[57] ABSTRACT

A rail-borne motor coach for conveying passengers has at least one coach body, the side walls of which have windows and entry regions with doors. The coach body is constructed as a trough with a low-floor coach-body floor and raised coach heads. The side walls are a framework of side-wall pillars, lower longitudinal girders and upper longitudinal flanges. The upper longitudinal flanges are braced against one another by transverse connecting members.

25 Claims, 2 Drawing Sheets

RAIL-BORNE MOTOR COACH

CROSS-REFERENCE TO RELATED APPLICATION

This application is a continuation of international application Ser. No. PCT/EP95/03777, filed Sep. 23, 1995.

BACKGROUND OF THE INVENTION

Field of the Invention

The invention relates to a rail-borne motor coach for conveying passengers, with at least one coach body, the side walls of which have windows and entry regions with doors.

Rail-borne motor coaches for conveying passengers have been widely known per se for a long time. They are frequently used for short-distance passenger traffic on railway lines. In accordance with the high mechanical stresses, the known motor coaches are correspondingly designed and configured for strength, although this has a disadvantageous effect on their weight and, as a result, on their fuel consumption.

SUMMARY OF THE INVENTION

It is accordingly an object of the invention to provide a rail-borne motor coach, which overcomes the above-mentioned disadvantages of the heretofore-known devices and methods of this general type and which is optimized in terms of a saving in weight while avoiding the disadvantages for the motor coach due to the mechanical stresses attributable to external effects.

With the foregoing and other objects in view there is provided, in accordance with the invention, a rail-borne motor coach for conveying passengers, comprising:

a coach body defining a trough;

the coach body having a coach-body floor and adjoining side walls, the side walls being formed with window openings and entry regions with door openings;

the side walls being a framework formed from lower longitudinal girders, upper longitudinal flanges, and side-wall pillars extending between the lower longitudinal girders and the upper longitudinal flanges; and connecting members bracing the upper longitudinal flanges against one another.

In accordance with an added feature of the invention, the coach-body floor is a corrugated-sheet floor with crossbeams for absorbing forces from payload in the coach body and transmitting the forces to the side walls and into the lower longitudinal girders, and including windows attached to the side-wall pillars at the window openings and lateral paneling elements attached to the side-wall pillars, the side-wall pillars being disposed in zigzag formation as seen in a side view of the coach body and being connected in a flexurally rigid manner to the lower longitudinal girders and the upper longitudinal flanges.

An optimum introduction and transmission of force is thereby ensured since, given this configuration, both horizontal and vertical loads can be absorbed by the side-wall pillars and transmitted to the longitudinal girders and longitudinal flanges to a sufficient extent.

In accordance with an additional feature of the invention, mutually adjacent side-wall pillars enclose an angle of 60°±10° with one another. One of the essential features of the invention of the motor coach is the framework formed from obliquely set girders and side-wall pillars, in which it is possible to dispense with the vertical girders which are provided in the prior art. With this configuration, it is possible to keep the girders or side-wall pillars free from bending torques and subject them only to tensile and compressive forces. The oblique side-wall pillars are, with their ends, disposed close together or even in an overlapping arrangement at the longitudinal girder and the longitudinal flange.

This zigzag framework structure of the side-wall pillars is interrupted only in the entry regions, by vertically arranged door pillars, the door pillars preferably being manufactured from reinforced profiles to thus allow an imposed transverse force to be transferred. The door pillars, which each frame an entry aperture that can be closed by doors, are likewise connected in a flexurally rigid manner to the lower longitudinal girders and the upper longitudinal flanges. In accordance with a further feature of the invention, the side-wall pillars include vertical door pillars disposed only at the entry region, the vertical door pillars being connected to the lower longitudinal girders and to the upper longitudinal flanges in a flexurally rigid manner, the vertical door pillars defining a frame for a door for closing the entry region.

In accordance with again an added feature of the invention, the coach body includes a low-lying low-floor region having the entry regions, and motor coach heads adjoining the low-floor region at both ends thereof, the motor coach heads being raised relative to the low-floor region. The low-floor region extends over at least 60% of the useful length of the coach body.

In accordance with again an additional feature of the invention, the motor coach includes windows disposed in the window openings, and interior paneling elements disposed in an interior of the coach body, the interior paneling elements extending from a bottom edge of the longitudinal girders to a lower edge of the windows, and from an upper edge of the windows to the upper longitudinal flanges. There are also provided railing flanges horizontally abutting the windows and the paneling elements. The railing flanges are screwed to the side-wall pillars, such that the railing flanges do not transmit forces from the framework. In the alternative, the railing flanges are clamped against the side-wall pillars, such that the railing flanges do not transmit forces from the framework. In accordance with again a further feature of the invention, the railing flanges are disposed at the lower edge and at the upper edge, respectively, of the windows. Preferably, the windows and the side-wall elements abutt one another in flush alignment.

In other words, the windows and side-wall elements attached to the side-wall pillars are preferably bonded adhesively to them. The additionally provided railing flanges serve as a horizontal abutment surface both for the windows and for the side-wall elements. Most importantly, the railing flanges are not involved in the transmission of forces and can therefore be attached to the side-wall pillars and door pillars in a relatively simple manner by means of a clamped and/or screwed joint.

The reduction in weight achieved by means of the framework construction can amount to 25% relative to the solid-wall construction widely used at present. In addition it is possible, by using sandwich components for the side-wall elements, to achieve 50% better thermal insulation relative to the current standard. It can clearly be seen from this that the configuration according to the invention of a motor coach allows a significant reduction in the energy required to operate the same. The maintenance costs for the operation of a motor coach of this kind are furthermore also lower than for comparable known vehicles. Moreover, acoustic insulation is improved by at least 10% relative to comparable prior art systems.

In accordance with yet an added feature of the invention, the external side walls are sandwich panels with a top layer formed from fiber-reinforced synthetic resin, for example GC-GFK2, and a plastic core, preferably composed of Divinycel H45. The plastic core has a thickness of about 15 mm while the overall sandwich panel has a total thickness of 20 mm. In addition, a metal sheet, preferably made of light alloy, can be arranged on the outside of the motor coach according to the invention, i.e. on the sandwich panel.

In accordance with an alternative embodiment, the sandwich panel has a plastic core between two wooden panels. It is thereby possible for a metal sheet, made for example of light alloy, to be disposed on its outer side and a plastic panel to be disposed on its inner side.

In accordance with yet an additional feature of the invention, selected parts of the coach body are adapted to transmit forces; those selected parts are manufactured from rectangular-section steel tubes and bent steel-sheet profiles. In fact, all of the load-bearing parts of the coach body are manufactured from steel profiles, whether of square-section steel tube or bent steel-sheet profiles. Although, in principle, this means a higher specific weight relative to a construction of light alloy, the better modulus of elasticity of the steel tubes gives a higher stiffness for lower cross-sections and thus a more favorable weight combined with easier handling during manufacture.

In accordance with yet a further feature of the invention, the window openings extend continuously from one of the entry regions to another of the entry regions.

In accordance with again a further feature of the invention, the windows and the interior paneling elements are attached to the side-wall pillars, to the railing flanges and to the door pillars by an adhesive bond.

In accordance with yet other features of the invention, the side-wall pillars are bolted, welded, riveted, and/or adhesively bonded to at least one of the lower longitudinal girders and/or to the upper longitudinal flanges.

In accordance with an added feature of the invention, motor coach including a roof member extending between the upper longitudinal flanges, the roof member is one or more shaped parts and, similarly to the wall panels, is formed as a sandwich panel.

All joints formed at the side-wall elements, at the windows and at the shaped roof parts are sealed with sealing material.

In accordance with an additional feature of the invention, the side-wall pillars include vertical door pillars with reinforced profiles disposed at either sides of the entry region, the vertical door pillars being connected to the lower longitudinal girders and to the upper longitudinal flanges in a flexurally rigid manner, the vertical door pillars defining a frame for a door for closing the entry region.

In accordance with a concomitant feature of the invention, the side-wall pillars and the door pillars have substantially the same profile, and including a transverse bar bracing and reinforcing mutually parallel door pillars forming a door opening against one another.

Other features which are considered as characteristic for the invention are set forth in the appended claims.

Although the invention is illustrated and described herein as embodied in a rail-borne motor coach, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
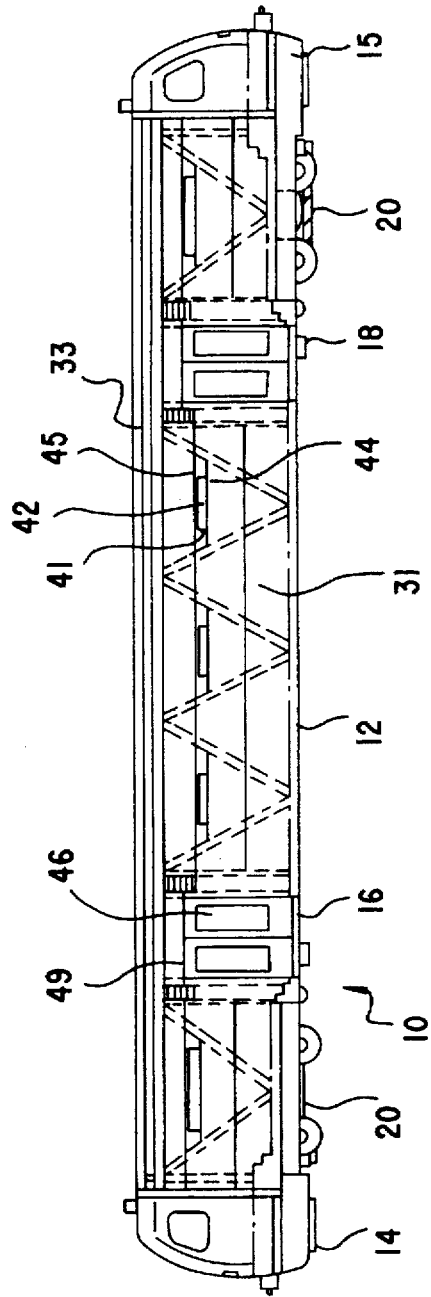
FIG. 1 is a side-elevational view of a one-piece motor coach according to the invention.
Figure 2:
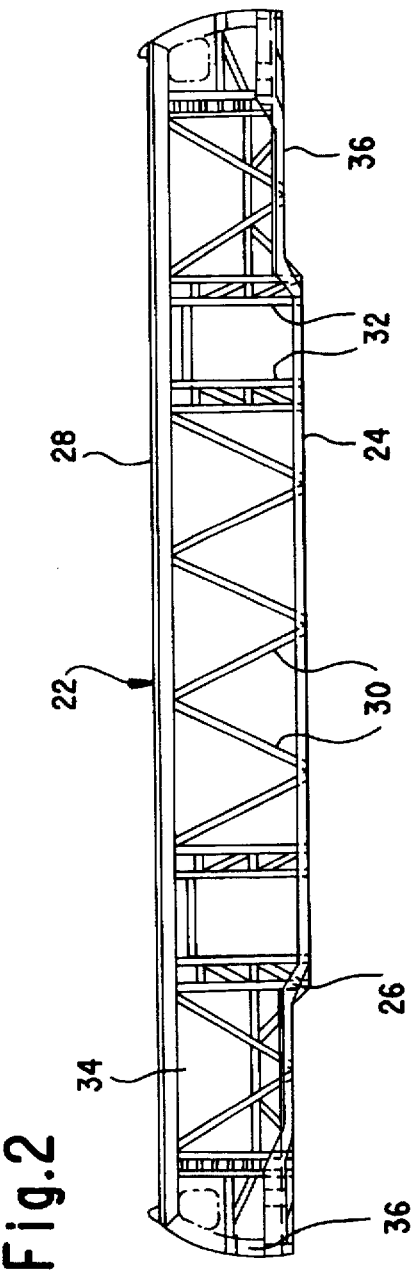
FIG. 2 is a similar view of the same coach body in an unfinished state.

FIG. 1 shows a motor coach 10 which is of low-floor design, its low-floor region 12 being arranged centrally and being framed at both ends in each case by motor-coach heads 14, 15. The low-floor region occupies about ⅔ of the total useful area of the motor coach 10. The low-floor region is provided on each longitudinal side with two entry regions 16 and 18 having door openings 49 and doors 46". With particular reference to FIG. 1, the floors of the motor-coach heads 14 and 15 are raised because of the running-gear assemblies 20 (disposed underneath) and the drive units. The low-floor region 12 is lowered relative to the floors of the coach heads; the low-floor regions 12 is constructed close to the ground, allowing passengers to enter and exit without any problems.

The coach body 22 is formed approximately trough-like, with a coach-body floor 24 formed from corrugated sheet with crossbeams. The floor 24 is framed on both sides by longitudinal girders 26. Side walls 34 of the through-like coach body 22 are formed by the longitudinal girders 26 together with a respective upper longitudinal flange 28 and side-wall pillars 30 and door pillars 32 arranged therebetween.

The side-wall pillars 30 are oriented obliquely relative to one another. In each case they enclose an angle of about 60° between them. The ends of the side-wall pillars 30 are each arranged next to one another or in an overlapping configuration. They are connected in a non-bending, i.e., flexurally rigid, fashion to the lower longitudinal girder 26 and the upper longitudinal flange 28. Further reinforcements, in particular vertical or horizontal reinforcements, are not provided for force transmission, and in fact they are not required. The side-wall pillars 30 are indicated by means of dotted lines in FIG. 1, these lines being solid in the region of the window openings 41 containing 42. The windows 42 have a lower edge 44 and an upper edge 45.

Vertical door pillars are provided only at the entry regions 18. They ensure unhindered access to the motor coach 10. In order to be able to absorb and transfer the forces transmitted from the side-wall pillars 30, the door pillars 32 are, in the illustrated embodiment, formed by double profiles which are arranged in parallel and, for reasons of reinforcement, are reinforced by means of cross-braces. The different arrangement of the side-wall pillars 30 in the heads 36 of the coach body 22 is due to the overlapping stresses at the transitional region from the low-floor region 24 to the heads 36.

Figure 3:
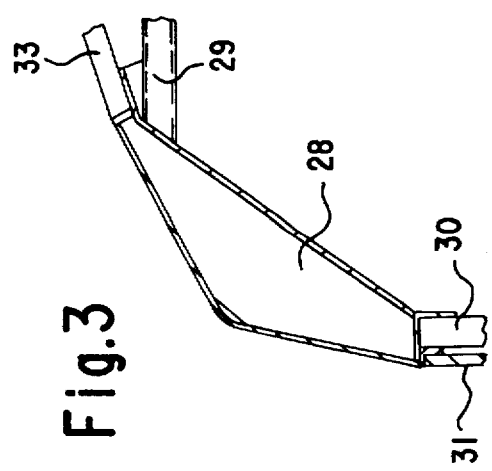
FIG. 3 is a partial cross-sectional view through an upper part of the motor coach of FIG. 1, taken at the transition between a side wall and the roof.

FIG. 3 shows a partial cross-section through the motor coach 10 according to the invention, with a side-wall pillar 30, a longitudinal flange 28 adjoining the latter at the top, and a horizontally arranged connecting bar 29 which leads to the upper longitudinal flange 28 on the opposite side, which is disposed longitudinally-symmetrically through the coach.

Lateral paneling 31, which is held on the side-wall pillar 30 by means of adhesive bonding, is mounted externally on the side-wall pillar 30. A shaped roof part 33 is disposed above the longitudinal flange 28 and the connecting bar 29 which, like the side-wall element 31, is of composite or sandwich (laminated) construction and which has a convex-concave cross-sectional profile.

The sandwich panels used for the side-wall elements have a plastic core, preferably composed of Divinycel H30 or H45 with a thickness of about 20 mm or 15 mm, which is provided with a top layer of fiber-reinforced fiber-plastic composite material, for example GC-GFK2, or of cured laminated fiber mats. The sandwich elements are preferably pressed under vacuum using a sheet-forming technique.

Figure 4:
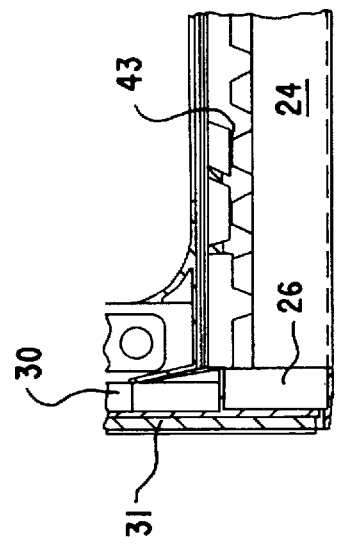
FIG. 4 is a partial cross-sectional view through a lower part of the motor coach of FIG. 1, taken at the transition between a side wall and the floor.

FIG. 4 illustrates the lower region of the same cross-section as that shown partially in FIG. 3. Here, too, the side-wall element 31 and the side-wall pillar 30 are connected to one another. The side-wall pillar 30 adjoins the longitudinal girder, which, for its part, is connected to the coach-body floor formed from corrugated sheet and crossbeams 43.

The internal panelling is in each case formed by a paneling which is laid against the framework from the inside and which is preferably held thereon in a positive-locking manner, e.g. by means of corresponding profiles into which the cover plates are introduced by their top and bottom edges. Instead or in addition, it is also possible for an adhesive bond to be provided between the framework members and the paneling.

Figure 5:
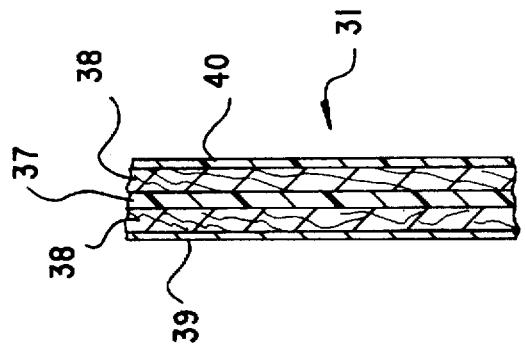
FIG. 5 is a partial section through a wall panel. Description of the Preferred Embodiments.

FIG. 5 illustrates the laminated sandwich structure of the paneling 31 and of the shaped roof parts 33. The external wall panels include a plastic core 37 which is sandwiched between two wooden panels 38. A light alloy sheet 39 covers the outside, and a plastic coating 40 covers the inside.

Figure 6:
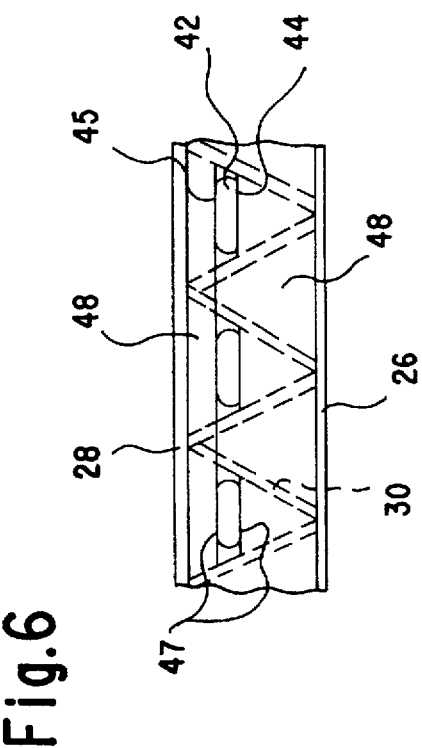
FIG. 6 is a fragmentary, front elevational view of the interior of the motor coach.

FIG. 6 shows the interior paneling elements 48 disposed in the interior of the coach body, the interior paneling elements 48 extending from a bottom edge of the longitudinal girders 26 to a lower edge 44 of the windows 42, and from an upper edge 45 of the windows 42 to the upper longitudinal flanges 28. There are also provided rail flanges 47 horizontally abutting the windows 42 and the interior paneling elements 48. The railing flanges 47 are screwed to the side-wall pillars 30 (shown by dashed lines) with non-illustrated screws, such that the railing flanges 47 do not transmit forces from the framework. The railing flanges 47 are disposed at the lower 44 and upper 45 edges of the windows. Preferably, the windows 42 and the side-wall elements 30 abutt one another in flush alignment.

I claim:

1. Rail-borne motor coach for conveying passengers, comprising:

a coach body defining a trough;

said coach body having a coach-body floor and adjoining side walls, said side walls being formed with window openings and entry regions with door openings;

said side walls being a framework formed from lower longitudinal girders, upper longitudinal flanges, and side-wall pillars extending between said lower longitudinal girders and said upper longitudinal flanges, said sides-wall pillars being mutually adjacent and all enclosing an angle of 60° +/− 10° against one another;

said side walls including vertical pillars disposed only at said entry regions; and connecting bars bracing said upper longitudinal flanges against one other.

2. The motor coach according to claim 1, wherein said coach-body floor is a corrugated-sheet floor with crossbeams for absorbing forces from payload in said coach body and transmitting the forces to said side walls and into said lower longitudinal girders, and including windows attached to said side-wall pillars at said window openings and lateral paneling attached to said side-wall pillars, said side-wall pillars being disposed in zigzag formation as seen in a side view of said coach body and being connected in a flexurally rigid manner to said lower longitudinal girders and said upper longitudinal flanges.

3. The motor coach according to claim 1, wherein said vertical pillars being connected to said lower longitudinal girders and to said upper longitudinal flanges in a flexurally rigid manner, said vertical pillars defining a frame for a door for closing said entry region.

4. The motor coach according to claims 1, wherein said coach body indcludes a low-lying low-floor region having said entry regions, and motor coach heads adjoining said low-floor region at both ends thereof, said motor coach heads being raised relative to said low-floor region.

5. The motor coach according to claim 4, wherein said coach body has a given length and said low-floor region extends over at least 60% of said given length.

6. The motor coach according to claim 1, including windows disposed in said window openings, and interior paneling elements disposed in an interior of said coach body, said interior paneling elements extending from a bottom edge of said longitudinal girders to a lower edge of said windows, and from an upper edge of said windows to said upper longitudinal flanges.

7. The motor coach according to claim 6, including railing flanges horizontally abutting said windows and said paneling elements.

8. The motor coach according to claim 7, wherein said railing flanges are screwed to said side-wall pillars, such that said railing flanges do not transmit forces from said framework.

9. The motor coach according to claim 7, wherein said railing flanges are clamped against said side-wall pillars, such that said railing flanges do not transmit forces from said framework.

10. The motor coach according to claim 7, wherein said railing flanges are disposed at the lower edge and at the upper edge, respectively, of said windows.

11. The motor coach according to claim 1, including windows disposed in said window openings and side-wall elements attached to said framework, said windows and said side-wall elements abutting one another in flush alignment.

12. The motor coach according to claim 1, wherein said coach body includes parts adapted to transmit forces, said parts being manufactured from rectangular-section steel tubes and bent steel-sheet profiles.

13. The motor coach according to claim 1, including external wall panels attached to said framework, said external wall panels being of sandwich construction.

14. The motor coach according to claim 1, including windows disposed in said window openings, interior paneling elements disposed in an interior of said coach body, and railing flanges horizontally abutting said windows and said paneling elements, said windows and said interior paneling elements being attached to said side-wall pillars, to said railing flanges and to said door pillars by means of adhesive bonding.

15. The motor coach according to claim 1, wherein said side-wall pillars are bolted to at least one of said lower longitudinal girders and said upper longitudinal flanges.

16. The motor coach according to claim 1, wherein said side-wall pillars are welded to at least one of said lower longitudinal girders and said upper longitudinal flanges.

17. The motor coach according to claim 1, wherein said side-wall pillars are adhesively bonded to at least one of said lower longitudinal girders and said upper longitudinal flanges.

18. The motor coach according to claim 1, wherein said side-wall pillars are riveted to at least one of said lower longitudinal girders and said upper longitudinal flanges.

19. The motor coach according to claim 1, including a roof member extending between said upper longitudinal flanges, said roof member being a shaped part.

20. The motor coach according to claim 19, wherein said shaped part is a plurality of shaped parts.

21. The motor coach according to claim 19, wherein said shaped part has a sandwich structure.

22. The motor coach according to claim 1, including windows disposed in said window openings, side-wall elements attached to said framework, and a roof member formed of shaped parts, and sealing material sealing all joints formed at said side-wall elements, at said windows and at said shaped roof parts.

23. The motor coach according to claim 1, wherein said side-wall pillars include vertical door pillars with reinforced profiles disposed at either sides of said entry region, said vertical door pillars being connected to said lower longitudinal girders and to said upper longitudinal flanges in a flexurally rigid manner, said vertical door pillars defining a frame for a door for closing said entry region.

24. The motor coach according to claim 1, wherein a profile of said side-wall pillars is substantially identical to a profile of said door pillars, two mutually parallel door pillars defining said entry opening therebetween, and including a transverse bar bracing and reinforcing said mutually parallel door pillars against one another.

25. A rail-borne motor coach for conveying passengers, comprising:

a coach body defining a trough;

said coach body having a coach-body floor and adjoining side walls, said side walls being formed with window openings and entry regions with door openings;

said side walls being a framework formed from lower longitudinal girders, upper longitudinal flanges, and side-wall pillars extending between said lower longitudinal girders and said upper longitudinal flanges;

connecting bars bracing said upper longitudinal flanges against one another; and external wall panels attached to said framework, said external wall panels having a plastic core sandwiched between two wooden panels, a light-alloy sheet disposed on one of said wooden panels and a coating of plastic on the other side of said wooden panels.

* * * * *

UNITED STATES PATENT AND TRADEMARK OFFICE
CERTIFICATE OF CORRECTION

PATENT NO. : 5,749,302
DATED : May 12, 1998
INVENTOR(S) : Ferdinand Tegeler

It is certified that error appears in the above-indentified patent and that said Letters Patent is hereby corrected as shown below:

ON THE TITLE PAGE:

Item [30] should read as follows:

Sep. 30, 1994  [DE]  Germany .......G94 15 771.5

Signed and Sealed this

Fourth Day of August, 1998

Attest:

BRUCE LEHMAN

*Attesting Officer*   *Commissioner of Patents and Trademarks*